(12) United States Patent
Thielow et al.

(10) Patent No.: US 9,151,020 B2
(45) Date of Patent: Oct. 6, 2015

(54) DEVICE FOR EXTRACTING WATER FROM ATMOSPHERIC AIR

(75) Inventors: Frank Thielow, Bodnegg (DE); Christian Thielow, Lindau (DE)

(73) Assignee: LOGOS-INNOVATIONEN GMBH, Bodnegg (DE)

( * ) Notice: Subject to any disclaimer, the term of this patent is extended or adjusted under 35 U.S.C. 154(b) by 853 days.

(21) Appl. No.: 13/261,176

(22) PCT Filed: Aug. 11, 2010

(86) PCT No.: PCT/DE2010/000952
§ 371 (c)(1),
(2), (4) Date: Apr. 24, 2012

(87) PCT Pub. No.: WO2011/018079
PCT Pub. Date: Feb. 17, 2011

(65) Prior Publication Data
US 2012/0205823 A1    Aug. 16, 2012

(30) Foreign Application Priority Data
Aug. 11, 2009  (DE) .......................... 10 2009 036 933

(51) Int. Cl.
*E03B 3/28*      (2006.01)
*B01D 53/18*     (2006.01)
*B01D 53/26*     (2006.01)

(52) U.S. Cl.
CPC ............... *E03B 3/28* (2013.01); *B01D 53/185* (2013.01); *B01D 53/263* (2013.01); *B01D 2251/304* (2013.01); *B01D 2252/1035* (2013.01); *B01D 2257/80* (2013.01)

(58) Field of Classification Search
None
See application file for complete search history.

(56) References Cited

U.S. PATENT DOCUMENTS 7,722,706 B2 *  5/2010  Thielow .......................... 95/211

FOREIGN PATENT DOCUMENTS

| DE | 285142 | 3/1914 |
|----|--------|--------|
| DE | 2 305 652 | 8/1974 |
| DE | 28 10 241 | 9/1979 |
| DE | 26 60 068 | 2/1980 |
| DE | 198 50 557 A1 | 5/2000 |
| DE | 103 09 110 A1 | 9/2004 |
| DE | 10 2004 026 334 A1 | 1/2005 |
| WO | WO 03/104571 A1 | 12/2003 |
| WO | WO 2004/106649 A1 | 12/2004 |

* cited by examiner

*Primary Examiner* — Duane Smith
*Assistant Examiner* — Phillip Shao
(74) *Attorney, Agent, or Firm* — Breneman & Georges

(57) ABSTRACT

A device for extracting water from atmospheric air (18) by means of a flowable sorbent for the sorption of the water, in particular a brine solution with a hygroscopic salt, the sorption being provided at least along a sorption path (1, 5), the flowable sorbent being arranged at least along the sorption path (1, 5) essentially on a guide element (1) for guiding the sorbent, the guide element (1) having at least two distributor elements (3), arranged at least partially vertically one above the other, for enlarging the sorption area or sorption path (5), is proposed, which achieves a better energy yield in order to implement an economical type of operation. This is achieved, according to the invention, in that a width (27), formed as a projection onto the horizontal plane, of the distributor element (3) is greater than a height (26), formed as a projection onto a vertical plane, of the distributor element (3).

18 Claims, 11 Drawing Sheets

DEVICE FOR EXTRACTING WATER FROM ATMOSPHERIC AIR

Figure 1:
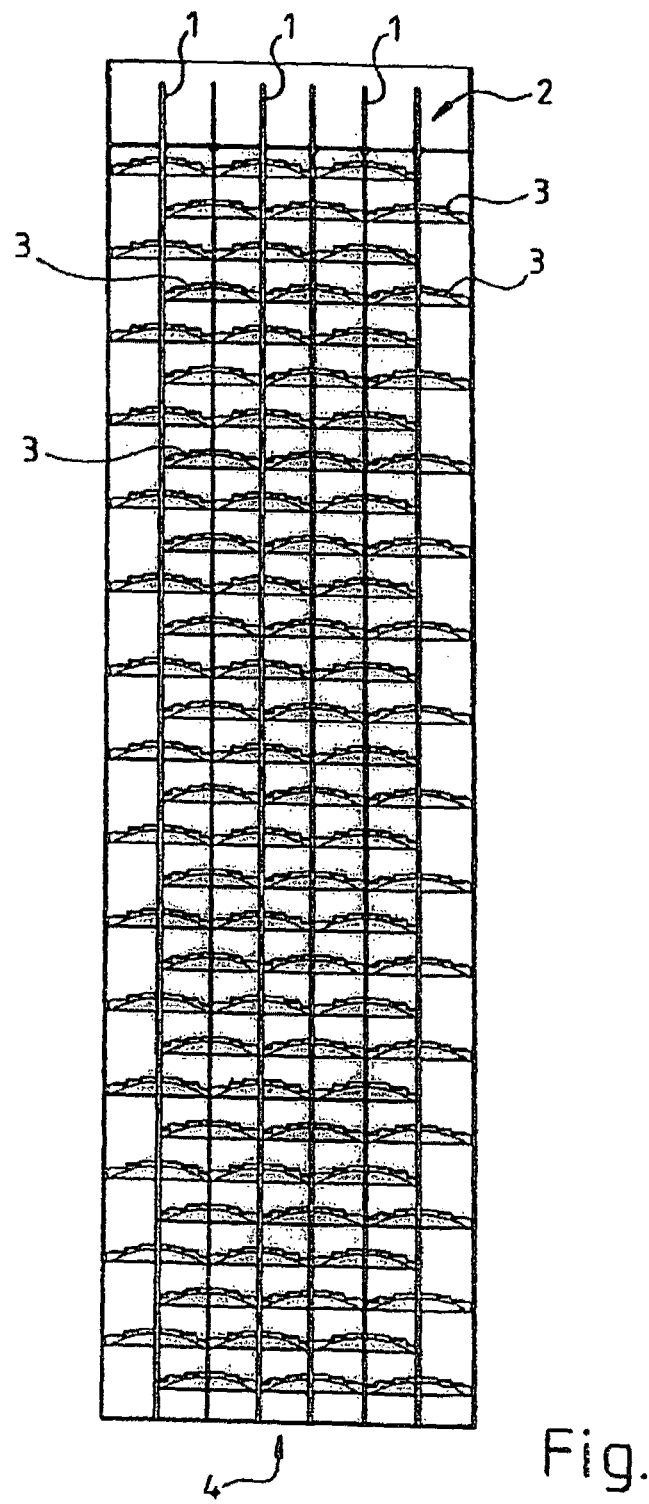

The invention relates to a device for extracting water from atmospheric air according to the preamble of claim 1.

In many places on Earth, especially in semi-arid or arid regions, such as, for example, in parts of Israel, Egypt and the Sahel zone and in numerous hot deserts lying at a marked distance from the ocean, there are, at least for entire years, no stocks of drinking water. Besides transporting drinking water, there is here only the possibility of providing it from moist air.

Condensers for extracting condensable water from atmospheric air by means of a coolable cold accumulator are already variously known, the relatively moist atmospheric air being cooled to below the dew point (cf. DE 28 10 241, DD 285 142 A5).

Furthermore, devices are also known which bind atmospheric water in an absorption phase by means of an adsorptive or absorptive material, such as a salt, for example sodium chloride, or the like. In this case, the salt or the corresponding brine solution is generally stored in a liquid container, and the water level or the vertically viewed top side of the salt or brine is to be considered as the water-adsorbing or water-absorbing surface. In a desorption phase, this salt/water solution or brine is dehumidified in order to extract the drinking water, and the salt is made available again for absorption (cf., for example, DE 2 660 068, DE 198 50 557 A1). Disadvantages of these methods or devices, however, are the comparatively large construction volume and the relatively low yield of drinking water per unit volume of the brine.

Moreover, devices with brine solutions, which have a comparatively high yield per unit volume, are already known from the publications DE 103 09 110 A1 or DE 10 2004 026 A1.

It has been shown in the meantime, however, that the expenditure of energy per extracted liter of water or drinking water is still clearly too high to achieve economical extraction of water from atmospheric air.

The object of the invention is, therefore, to propose a device for extracting water from atmospheric air by means of a flowable sorbent, in particular a brine solution with a hygroscopic salt for the sorption of the water, which device achieves a better energy yield, particularly in order to ensure an economical type of operation.

Proceeding from a device of the type initially mentioned, this object is achieved by means of the characterizing features of claim 1. Advantageous versions and developments of the invention are possible by virtue of the measures mentioned in the subclaims.

Accordingly, a device according to the invention is distinguished in that a width, formed as a projection onto a horizontal plane, of the distributor element is greater than a height, formed as a projection onto a vertical plane, of the distributor element.

Surprisingly, it was shown in the initial tests that, by virtue of this advantageous measure, an especially low expenditure of energy is necessary.

The present invention thus represents a departure from the previous invention according to DE 10 2004 026 334. In this initial development, the applicant assumed that a vertical direction of flow of the flowable sorbent or brine solution along the "strings of pearls" or the guide element having the distributor elements leads to good sorption, while at the same time saving energy, because gravity is utilized. Accordingly, DE 10 2004 026 334 discloses guide rods or "strings of pearls" or distributor elements, the latter being essentially round or being extended in the vertical direction in order to influence the downward flow along the guide rods or the "strings of pearls".

According to the present invention, however, by contrast the distributor elements are "wider" than they are "high". As a result, the flow velocity of the sorbent is not maximized or high, as in the prior art, but instead the throughflow of air transversely to the guide element, in particular transversely to numerous guide elements arranged next to one another, with the advantageously designed distributor elements or "pearls" which, according to the invention, are wider than higher, is improved or optimized. Preferably, the width of the distributor element is greater than the height of the distributor element at least by the factor three, in particular, for example, by the factor five or six to ten.

Basically, according to the invention, a distributor element or distributor elements advantageously designed especially aerodynamically can be implemented. For example, an aerodynamically beneficial cross section is provided, in particular an approximately drop-shaped, lenticular or wing-shaped cross section of the distributor elements. On account of this, where appropriate, additional aerodynamically advantageous effects can be implemented.

Advantageously, an essentially horizontally oriented outer contour of the distributor element is provided, so that numerous distributor elements form an essentially area-covering arrangement. This measure additionally improves the throughflow of the air. The distributor elements arranged next to one another in the horizontal direction form virtually continuous surfaces, that is to say flow surfaces or virtual tiers or the like, along which the atmospheric air can flow in an aerodynamically beneficial way.

In an advantageous variant of the invention, a vertically oriented height of the distributor element is lower at a marginal region of the distributor element than in the region of the guide element and/or in the region of the middle of the distributor element. This measure, too, improves the aerodynamics of the device according to the invention.

According to the invention, an aerodynamically advantageous throughflow of the device according to the invention is advantageously ensured, even when numerous guide elements are used, which are preferably arranged next to one another, and/or numerous distributor elements are used, which are preferably arranged one above the other. In this case, in contrast to the abovementioned prior art, few or no dead spaces for the air flowing through are generated behind the guide elements or distributor elements. In the prior art, the result of the pronounced dead spaces with almost non-flowing air was that sorption at the corresponding distributor element was impaired or came to a standstill. Even the use of a blower for improving the throughflow could maintain sorption to only a limited extent. According to the present invention, such a blower is not necessary, and therefore a considerable energy saving is implemented by the device according to the invention because the artificial generation of an airflow is dispensed with.

The object according to the invention can also be achieved by means of a device according to the preamble of claim 1, a flow bed of the sorption path on the top side of the distributor element having a profile which is different from the profile of a flow bed of the sorption path on the underside of the distributor element. It is thereby possible to adapt the distributor element in such a way that the flowable sorbent or a brine solution exhibits a different flow behavior along a top side of a body than along an underside of a body, that is to say "headfirst". Accordingly, the profile of the sorption path or flow bed on the top side can be optimized and the profile of the sorption path or flow bed along the underside can be optimized separately or independently of this in a different way.

Advantageously, at least the flow bed of the sorption path on the top side of the distributor element has a path-lengthening profile. The sorption duration and/or sorption area is thereby enlarged or lengthened, this being greatly advantageous for sorption.

In this case, a combined effect is also implemented by means of the design according to the invention of the distributor element. The comparatively wide distributor element makes it possible especially advantageously to implement the path-lengthening profile or the lengthened sorption path/flow bed on the top side, that is to say the side directed upward in the vertical direction.

Preferably, the flow bed of the sorption path on the underside of the distributor element has a profile oriented essentially in the radial direction. Inter alia, this effectively prevents the sorbent or the brine solution from breaking away or drifting away from the distributor element.

In an advantageous variant of the invention, at least the length of the sorption path and/or flow bed on the top side of the distributor element is greater at least by the factor ten than the vertically oriented sorption height of the sorption path on the top side of the distributor element. Initial tests have shown that such low pitches of the flow bed or sorption path in comparison with the largely vertical flow direction according to the prior art bring about an improvement in the sorption process.

Preferably, at least the length of the sorption path and/or flow bed on the top side of the distributor element is greater at least approximately by the factor twenty, fifty, in particular one hundred, than the vertically oriented sorption height of the sorption path on the top side of the distributor element. For example, the flow bed on the top side of the distributor element is approximately between 0.5 and 1 cm high and the length of the flow bed is approximately 40 to 100 cm, in particular approximately 50 cm long.

Advantageously, the guide element has at least one flow bed of the sorption path which extends at least about an axis of the guide element and/or of the distributor element over at least 180°, or a flow bed is designed as a steering device for steering the flowable sorbent, so that, as seen in the horizontal direction, essentially the sorption path extends about an axis of the guide element over at least half a circle arc, preferably, at least once, over the entire circle arc.

What is achieved thereby is that, in comparison with the prior art, with the construction height of the device or of the sorption space being the same, the sorption path is lengthened markedly, thus leading to a corresponding lengthening of the sorption phase and therefore to optimization of sorption or to saturation of the sorbent even in the case of low construction heights. Correspondingly low devices according to the invention can be produced and/or operated especially cost-effectively and can therefore be implemented economically.

In an advantageous embodiment of the invention, the flow bed or steering device is designed as a shallow flow bed of the distributor element with an essentially vertically oriented margin. The margin ensures that the sorbent is advantageously guided or steered both on the top side and on the underside of the distributor element.

Advantageously, the guide element comprises at least numerous distributor elements for enlarging the sorption area. This measure, too, improves sorption, thus leading to an economically beneficial type of operation.

In a particular development of the invention, the distributor element has at least the steering device, so that, as seen in the horizontal direction, essentially the sorption path extends about an axis of the distributor element over at least half a circle arc, preferably, at least once, over the circle arc.

In general, in the context of the invention, extending over half or an entire circle arc is understood to mean an extent of the flow bed or steering device which extends essentially over an angle of approximately at least 180° and 360° respectively. This may take place only singly or once or else multiply. The latter means that the steering device is also, for example, of zigzag-shaped and/or serpentine or snaking design, preferably about the axis of the guide element or distributor element.

Advantageously, the flow bed or steering device is designed in such a way that, as seen in the horizontal direction, the sorption path extends about the axis of the guide element and/or distributor element over a multiple of the circle arc and/or a multiple of 360°. In particular, the flow bed or steering device is essentially in the form of a helix. It is thereby possible to implement a sorption path of the sorbent which, for example, extends twice or three times or even more often about the axis of the guide element and/or distributor element.

The sorption path on the guide element and/or distributor element is lengthened correspondingly markedly, as compared with the more or less single straight downward flow according to the prior art. Thus, with construction heights of the device or with lengths of the guide element and/or distributor element which are the same as compared to the prior art, an enormous lengthening of the path of the sorbent and therefore an appreciable lengthening of the sorption phase or sorption time duration are achieved. The sorbent or brine solution can thereby be saturated to as great an extent as possible with water from the atmosphere, in particular with realistic construction heights or dimensions of the device according to the invention.

Preferably, the flow bed or steering device is designed essentially as a depression and/or groove and/or channel of the guide element and/or distributor element. This enables the preferably liquid sorbent to be steered or conducted advantageously on the guide element and/or distributor element. Where appropriate, the depression or the like is generated even during the process of producing the guide element and/or distributor element and/or at a later stage by means of abrasive or cutting methods.

In an advantageous variant of the invention, the guide element is oriented essentially in the vertical direction and preferably has arranged on it the distributor element or numerous distributor elements. This can be produced advantageously, and above all gravity can in this case be employed effectively or be used as a drive of the flowable sorbent or brine liquid. This saves energy and leads to an economical type of operation.

In general, by virtue of the present invention, multiple pumping round, that is to say repeated or multiple pumping up, of the sorbent or brine liquid may be dispensed with. This is achieved inter alia by means of the long dwell time of the sorbent on the guide element or on the distributor elements. Energy for pumping round the sorbent is therefore saved to a considerable extent.

Advantageously, the guide element and/or the distributor element have/has at least one contact surface, composed essentially of glass, for the flowable sorbent or is composed essentially of glass. Glass is foodstuff-compatible, this being advantageous for the possible use of the extracted water as drinking water. Moreover, glass can easily be cleaned or is soiled relatively little, since adhesion on smooth glass is low. This, too, is especially advantageous in drinking water applications.

Preferably, at least the contact surface of the glass is designed as a roughened surface. The adhesion or steering of the sorbent or brine solution on the guide element and/or the distributor element is thereby markedly improved. The glass thus acquires hydrophilic properties. This optimizes the sorption process and, moreover, the drift away of the sorbent in the event of wind or storm is reduced or prevented.

In a particular development of the invention, at least the contact surface of the glass is designed as a surface blasted with an abrasive, in particular with solid particles, such as sand, glass beads or the like. It has been shown in initial tests that this leads to a special steering or conduction of the sorbent particularly in a corresponding channel or the like. Defined guidance of the sorbent along the entire guide element and/or distributor element is thereby achieved. This is critically important for a stable sorption process so as not to obtain any unwanted or undefined sorption paths in the sorption space.

Above all alternatively to blasting, at least the contact surface of the glass may be designed as an etched surface or as a ground surface.

The object according to the invention can also be achieved by means of a device according to the preamble of claim 1, the guide element having at least one capillary unit, comprising a capillary, for administering the flowable sorbent to the sorption path. The capillary may replace a separate closing element or closing mechanism or the like, thus leading to a considerable saving in economic terms.

Preferably, at least one metering unit with at least one metering orifice for administering the sorbent to the guide element is provided. This allows a defined addition of sorbent, thus having an advantageous effect in terms of sorption.

Preferably, the capillary comprises at least the metering orifice of the metering unit.

Advantageously, at least one pressure generation unit for applying pressure to the flowable sorbent arranged in a sorbent reservoir is provided. The addition or administration of the sorbent can thereby be checked or controlled by means of a pressure change. The capillary keeps the sorbent, for example, in the pressureless state of the sorbent in a sorbent reservoir or liquid tank or the like. The application of pressure or an increase in pressure presses or administers the sorbent to the guide element or guide elements and/or distributor element or distributor elements.

The pressure change may increase or decrease in a pulse-like manner and/or gradually or continuously. The sorption process or the quantity of sorbent in the sorption phase is controlled correspondingly, for example as a function of atmospheric moisture, air speed, temperature, etc.

In an advantageous variant of the invention, the length of the capillary, as seen in the direction of flow of the sorbent, is greater by a multiple than a diameter of the clear cross section of the capillary. The capillary action or force is improved or intensified with an increase in length of the capillary. Correspondingly, an especially long capillary can close the metering orifice more effectively or more reliably, the longer the capillary is in relation to its cross section or diameter. For example, diameters of approximately 1 to 10 mm, in particular 2 to 4 mm, are advantageous. Lengths of the capillary may lie in the range of centimeters.

In general, a sorption phase of half an hour or an entire hour is advantageous. That is to say, a sorbent or brine drop requires this time to flow along the guide element or the coiled sorption path.

An exemplary embodiment of the invention is illustrated in the drawing and is explained in more detail below by means of the figures.

Figure 2:
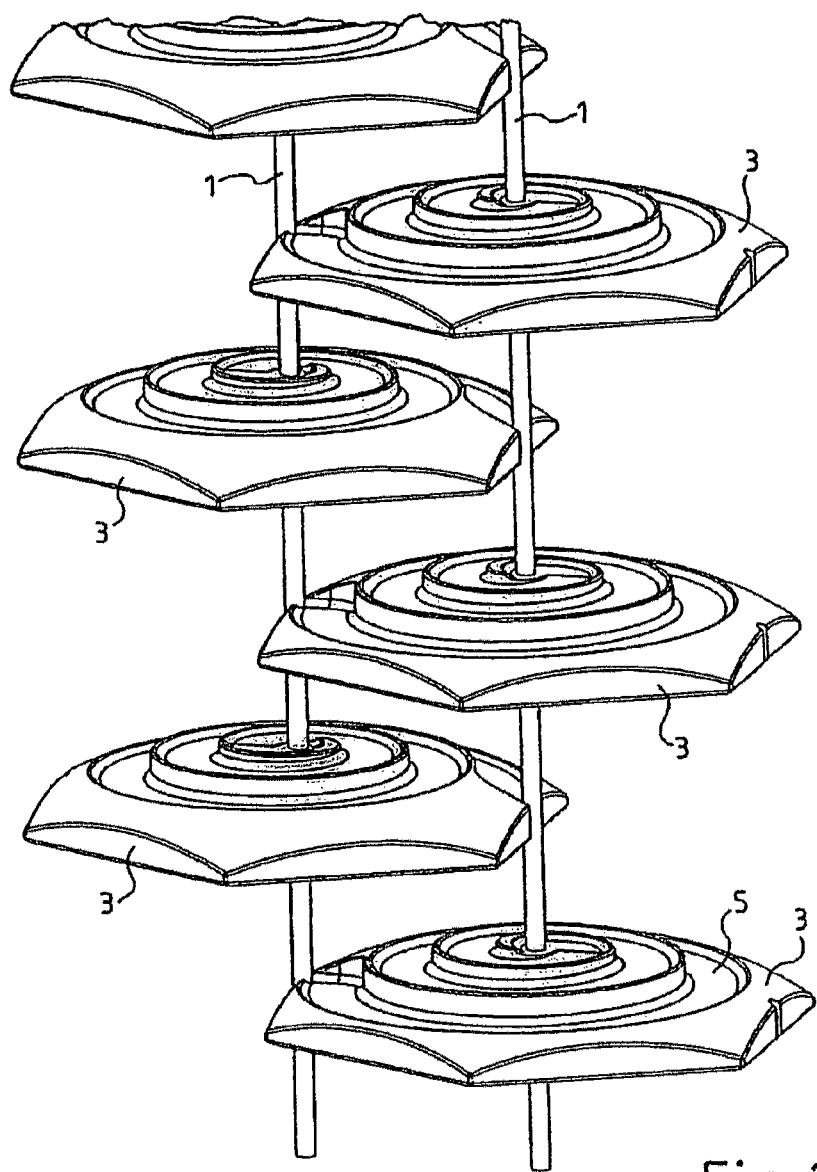
Figure 3:
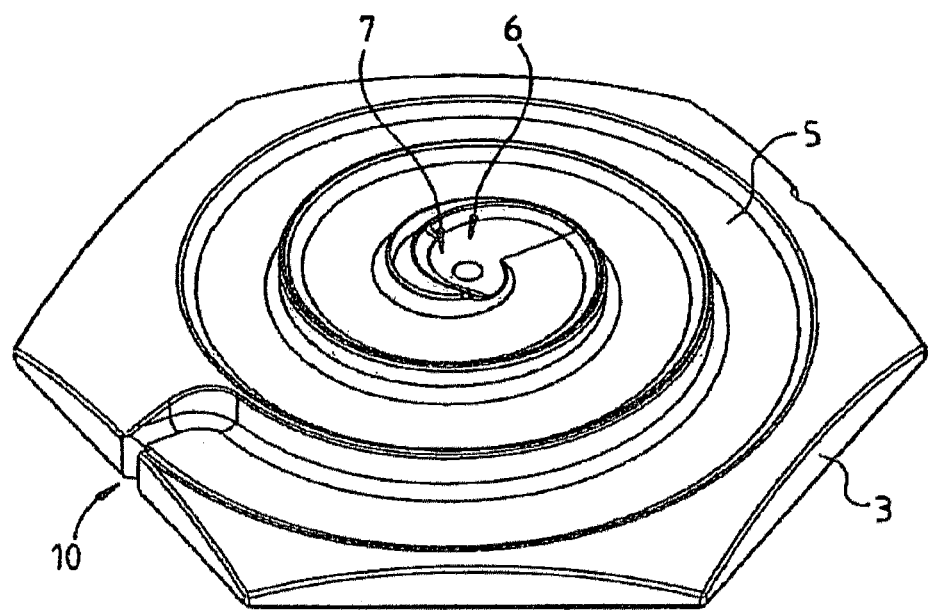
Figure 4:
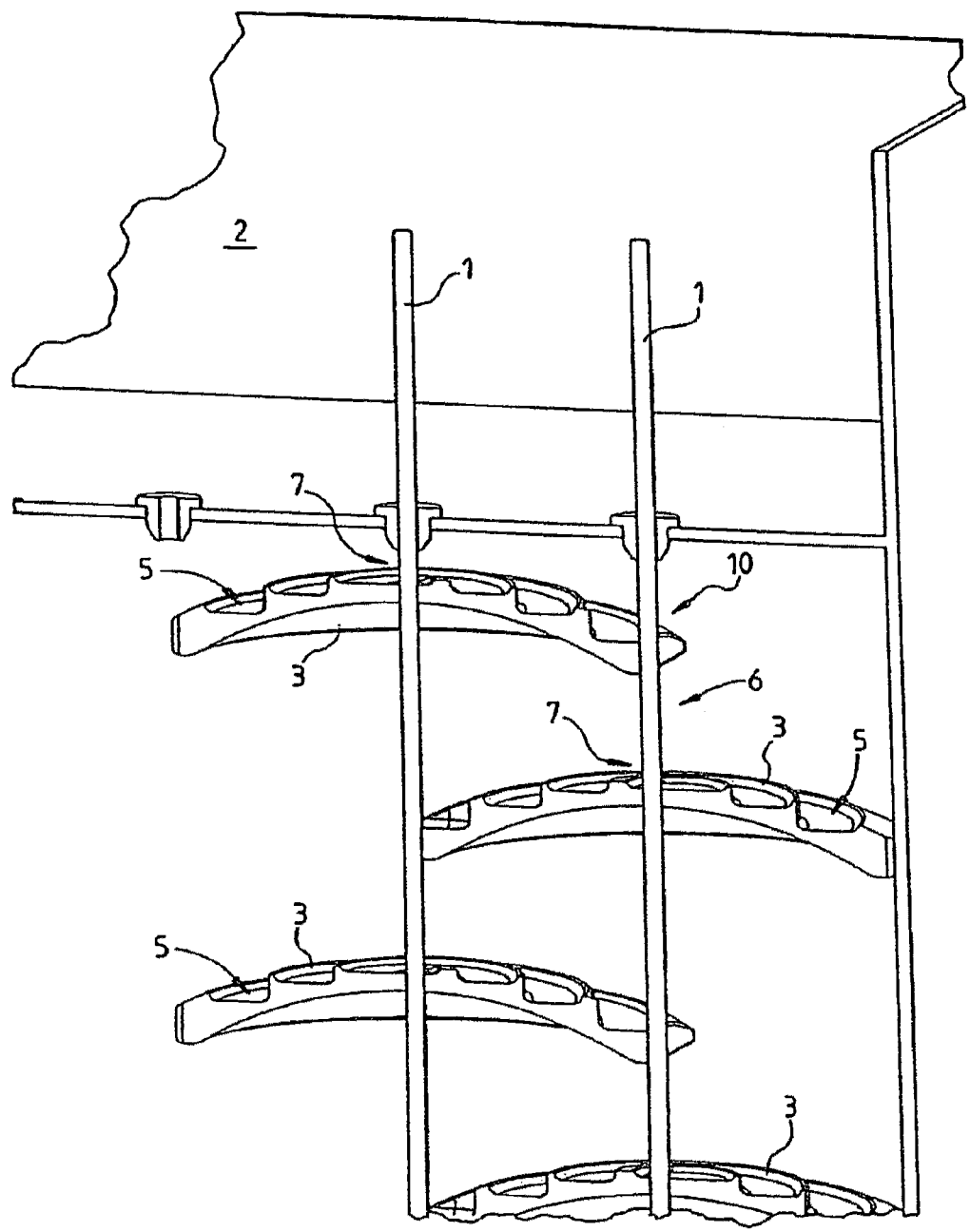
Figure 5:
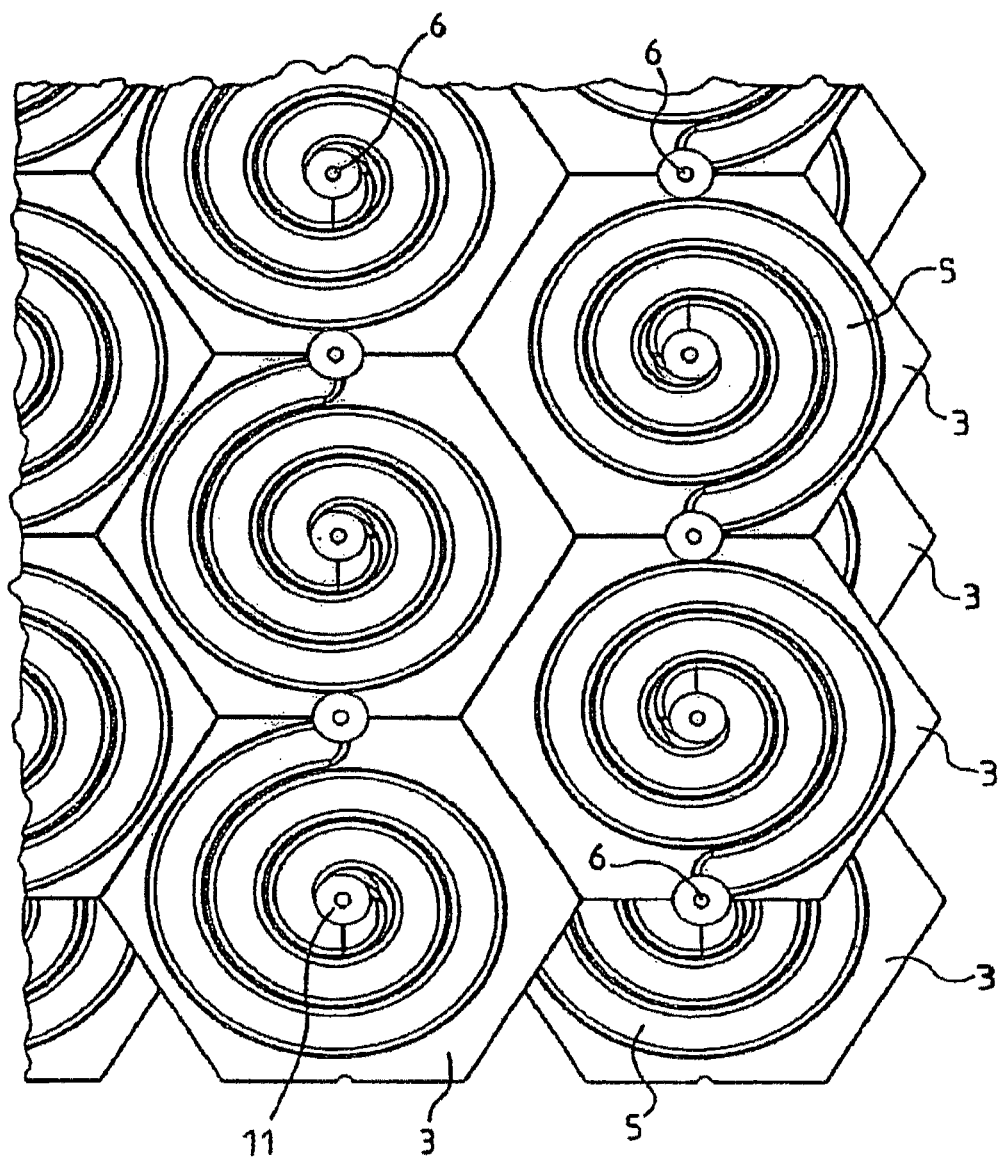
Figure 6:
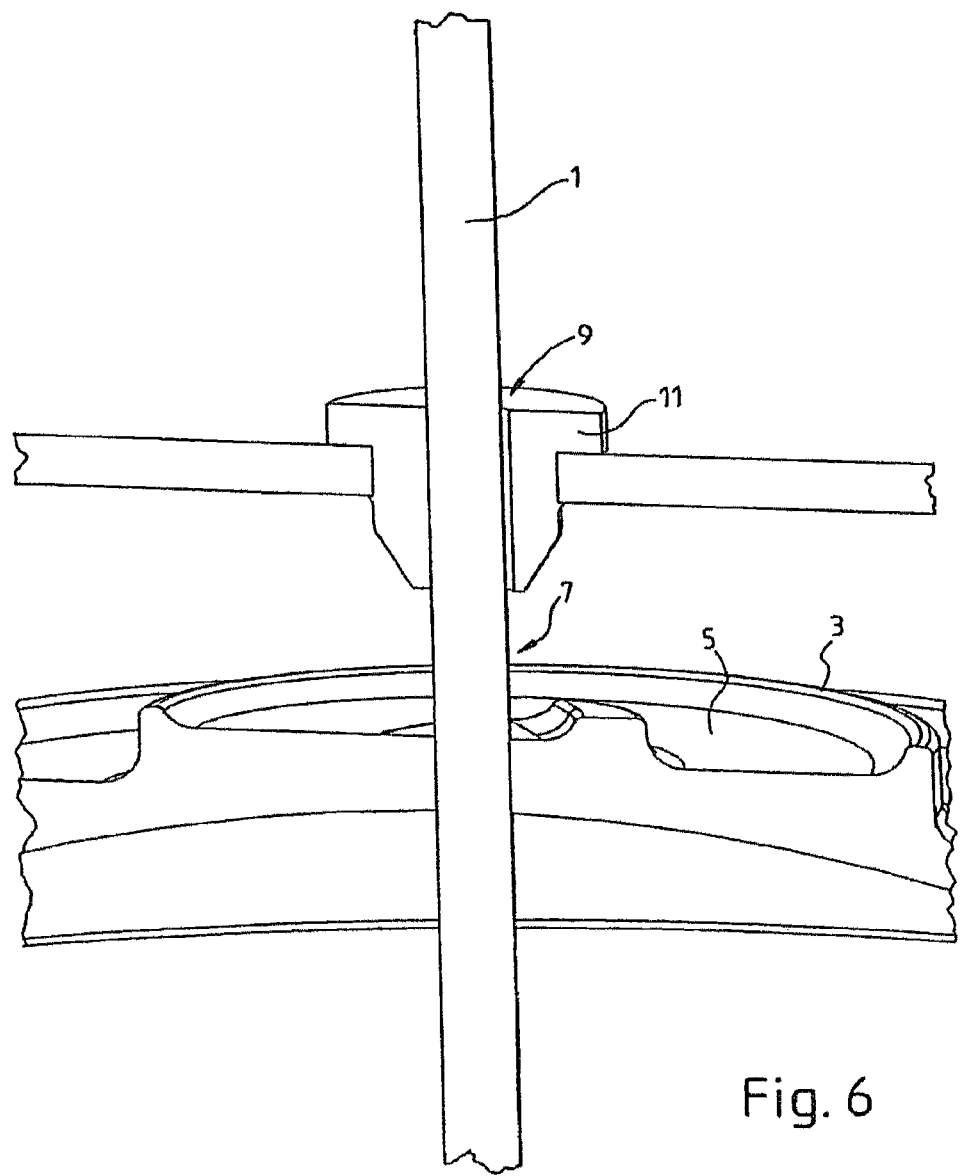
Figure 7:
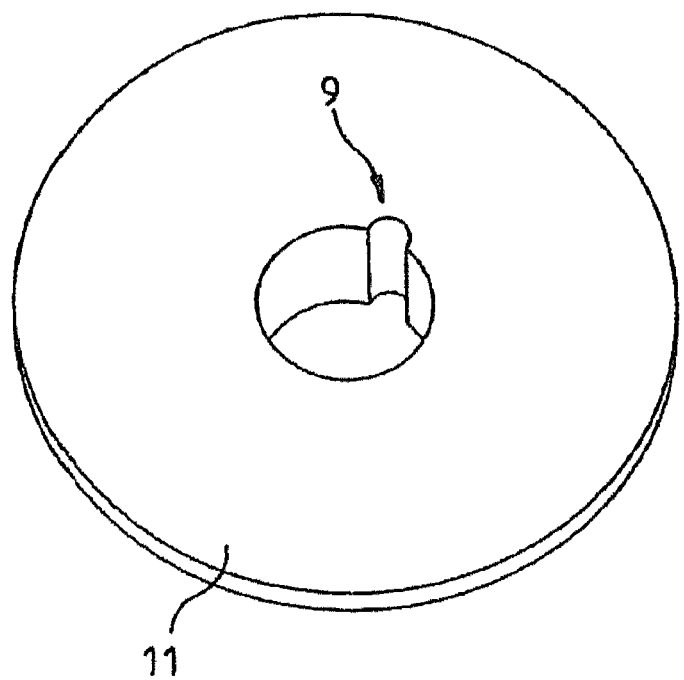
Figure 8:
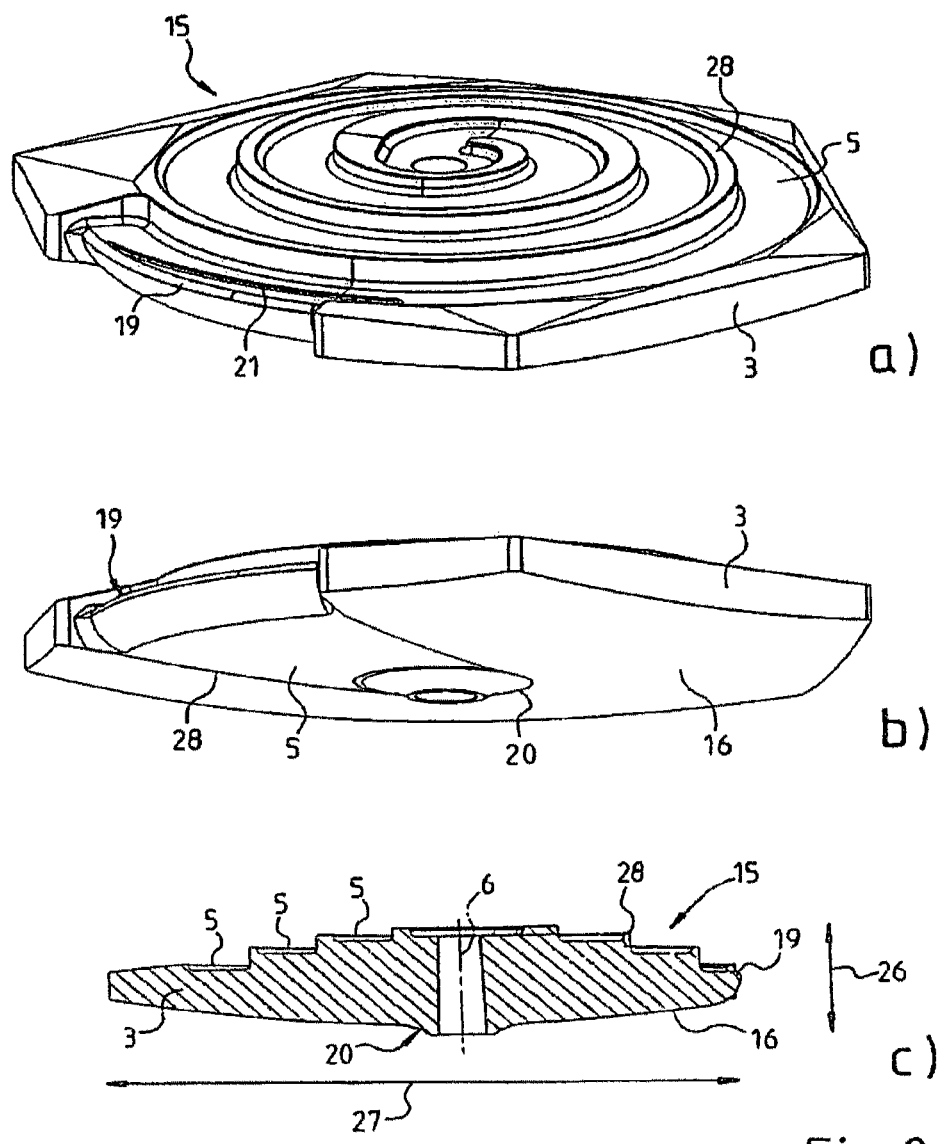
Figure 9:
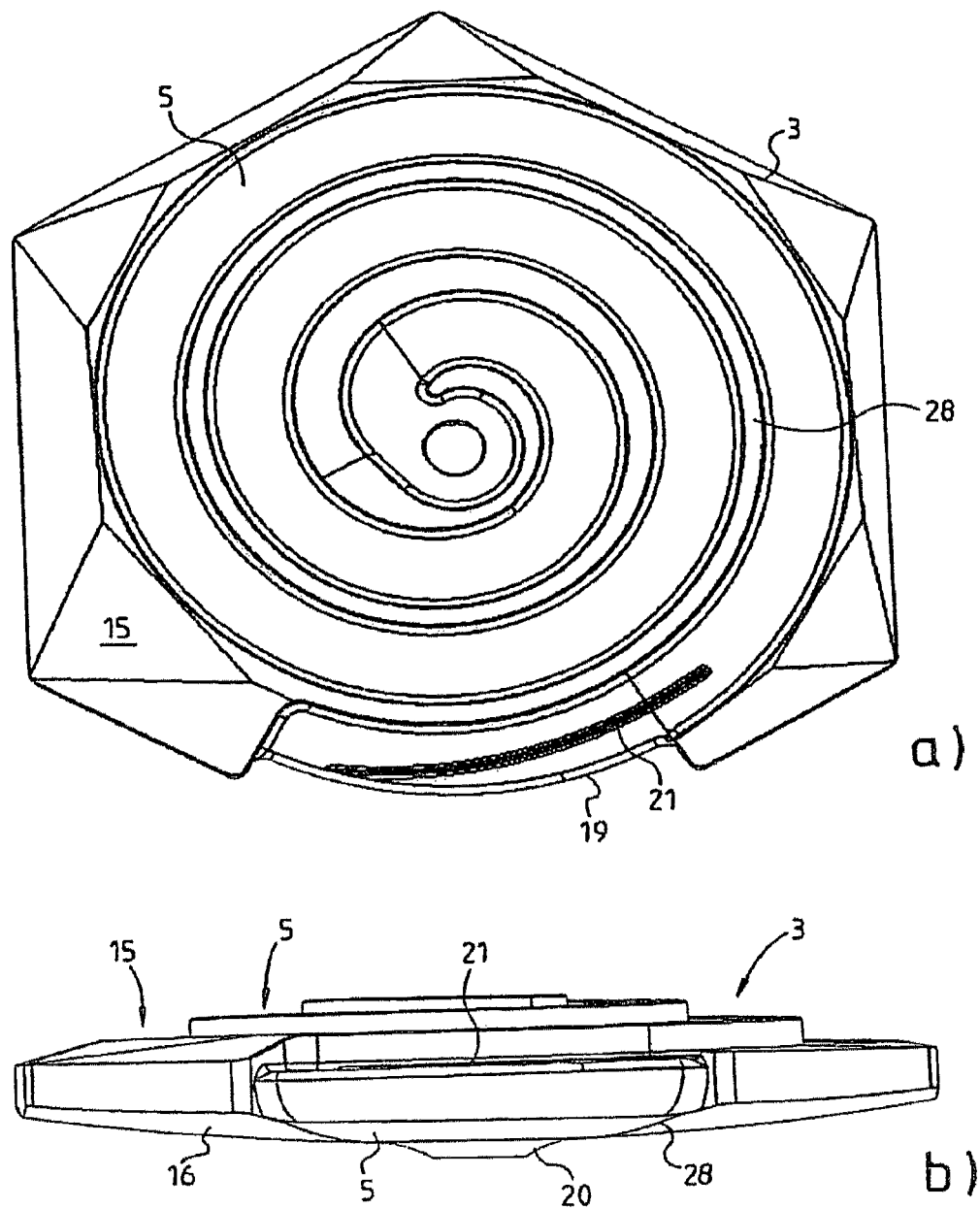
Figure 10:
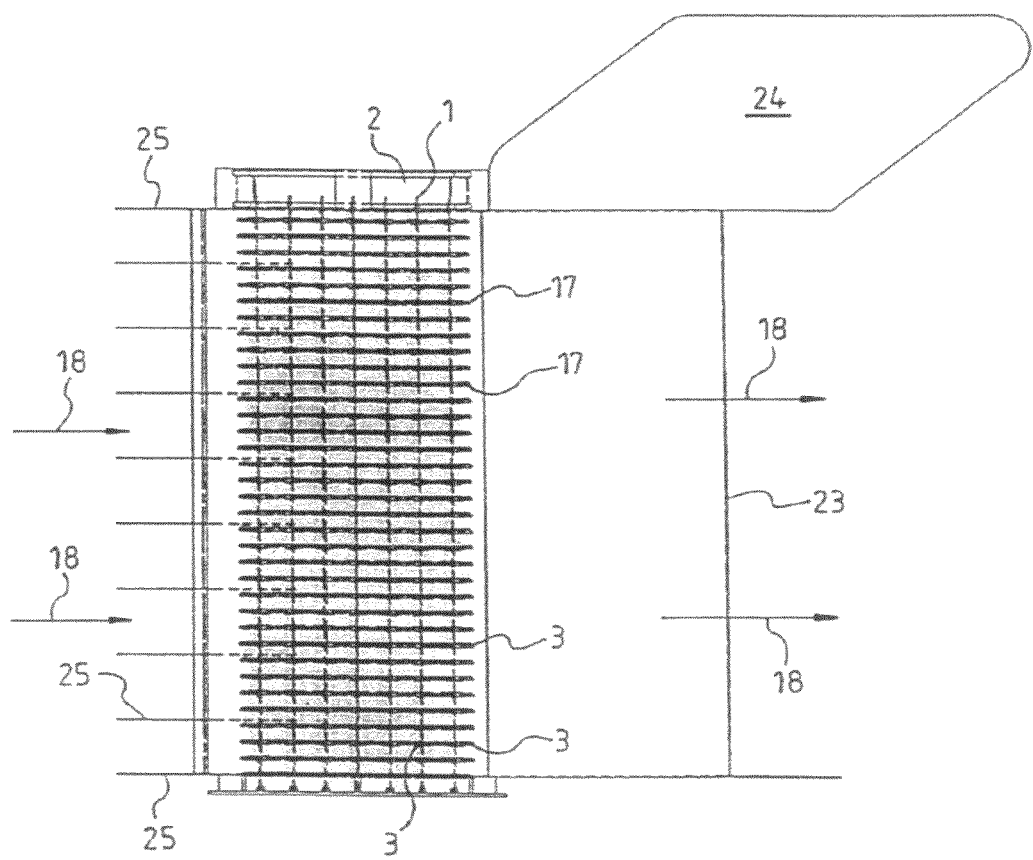
Figure 11:
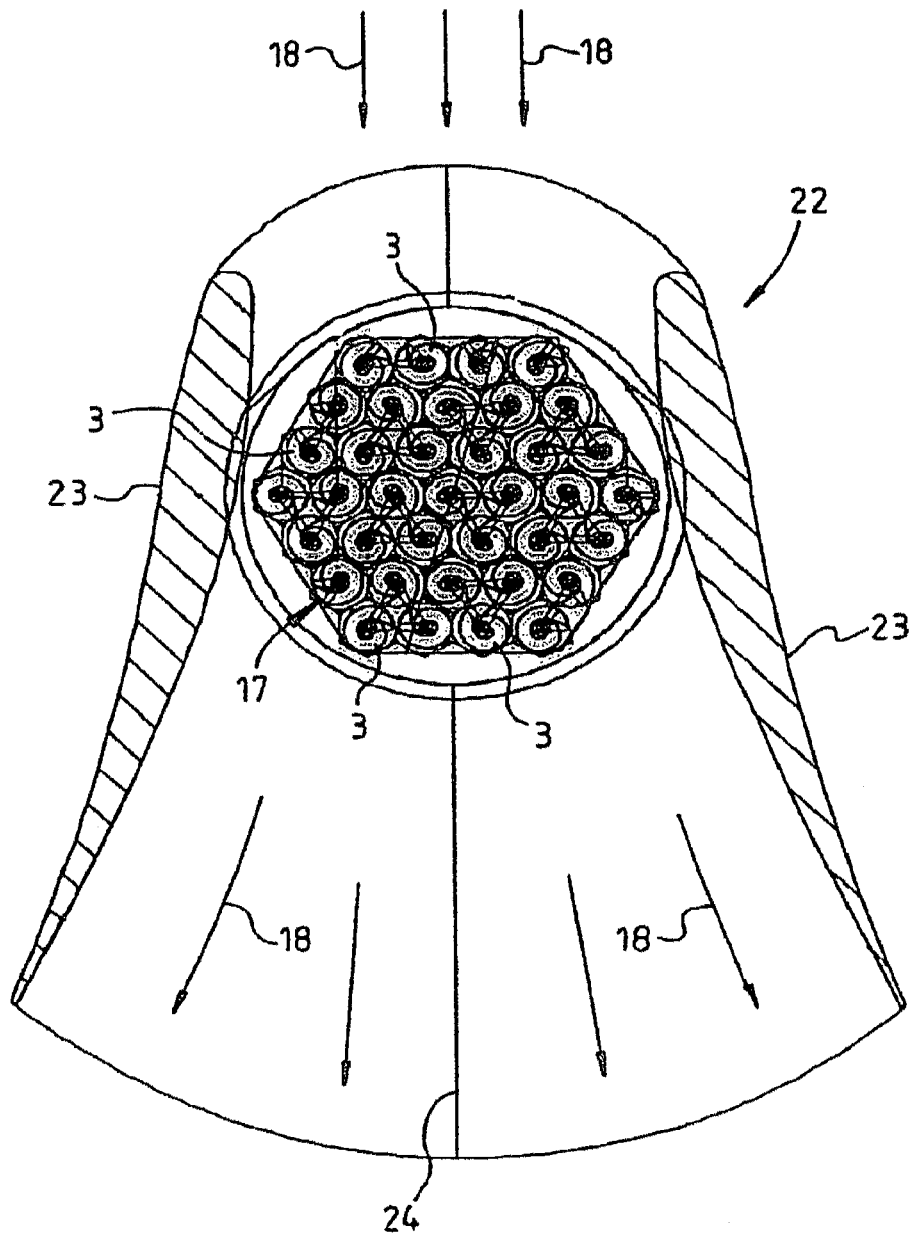

In particular:

FIG. 1 shows a diagrammatic illustration of a device according to the invention with guide elements resembling a string of pearls, FIG. 2 shows a diagrammatic perspective illustration of a detail of the guide elements according to FIG. 1, FIG. 3 shows a diagrammatic perspective illustration of a first distributor element according to FIG. 2, FIG. 4 shows a diagrammatic sectional illustration of an enlarged detail according to FIG. 1, FIG. 5 shows a diagrammatic top view of a plurality of guide elements or first distributor elements, FIG. 6 shows a diagrammatic sectional illustration of a capillary unit, FIG. 7 shows a diagrammatic perspective capillary unit, FIG. 8 shows a diagrammatic illustration of a second distributor element according to the invention in various views, FIG. 9 shows a diagrammatic top view and side view of the second distributor element according to FIG. 8, FIG. 10 shows a diagrammatic vertical sectional illustration through a device according to the invention with a jacket-type turbine, wind vane and sunshades, and FIG. 11 shows a diagrammatic horizontal sectional illustration through a device according to the invention with a jacket-type turbine.

In FIG. 1, a device according to the invention is executed diagrammatically as a module with six illustrated guide elements 1 having numerous first distributors 3 and with a brine reservoir 2 arranged on top and an outflow 4.

The brine reservoir stores a brine liquid which flows along the guide elements 1 downward and finally, enriched with water from the atmosphere or diluted, flows to the outflow 4.

Numerous distributors 3, over which the sorbent flows, are arranged along the guide elements 1. That is to say, the sorption path also leads via the distributors 3. The enlarged view according to FIGS. 2 to 5 illustrates the arrangement and design with the distributors 3 on the guide element 1. In this case, it becomes clear that the distributors 3 comprise a channel 5 or a flow bed 5 having laterally upstanding margins 28, which are designed as a helix and are coiled, for example, approximately three times about an axis 6 of the distributor 3 or guide element 1. That is to say, in the context of the invention, the channel 5 extends about the axis 6 over a threefold circle arc.

An inflow 7 of the channel 5 occurs on the guide element 1, on the one hand, from the brine reservoir 2 or a capillary 9. On the other hand, the said inflow occurs from an adjacent or laterally offset distributor 3 arranged above, or through the guide element 1.

A discharge 10 of the distributor 3 or of the channel 5 transfers the sorbent to a following distributor 3 or to an adjacent guide element 1 or to the outflow 4. The sorbent or the brine solution runs in the channel 5 with a very low pitch of preferably approximately 1 to 2° and, for example, is only approximately 0.3 to 0.4 mm thick. A comparatively good ratio of volume to sorption surface or a good flow velocity is thereby achieved.

The distributors 3 may have, for example, diameters of approximately 5, 10, 30 or 50 cm, in the case of the latter diameters of the channel preferably extending over markedly more circle arcs.

Furthermore, the distributors 3 are preferably of hexagonal design, so that they form a closed surface or layering, as seen in the top view according to FIG. 5.

This improves the aerodynamics of the system with regard to the air flowing through. The distributors 3 may also have a planar underside.

Metering preferably takes place via the capillary 9 which forms a capillary unit 11 in conjunction with the guide element 1. It is thereby possible to dispense with a mechanical closure, thus saving costs and control technology. Metering takes place, for example, via a pressure change of the sorbent in the reservoir 2. Drop metering is especially advantageous here.

The distributors 3 are preferably manufactured from glass. Glass can be produced by casting, pressing or the like. Moreover, recycling glass can be employed, thus additionally lowering the costs. Furthermore, glass is foodstuff-compatible, is highly stable and, for example, can be roughened by means of sand blasting or the like. Advantageously, the channel 5 is roughened, but the rest of the distributors 3 is not, this having a beneficial effect in flow terms.

The arrangement of numerous distributors 3 one above the other and next to one another improves the yield per volume or module. A plurality of modules can also be coupled to one another. The dimensions of a module according to the invention may, for example, be approximately 2.5 m high and approximately 2.5 m in diameter. In this case, multiple pumping round of the brine may be dispensed with, so that considerable energy savings, as compared with the prior art, are implemented. That is to say, the brine solution runs down from the reservoir 2 along the guide elements 1 or the distributors 3 and at the bottom is subjected in a way not illustrated in any more detail to separation, in particular distillation, of the extracted water or drinking water from, for example, the salt, and/or by means of a centrifuge or the like.

According to the first exemplary embodiment illustrated above, a second distributor 3 according to FIGS. 8 and 9 may also be provided. This likewise has a channel 5 or a shallow flow bed 5 which possesses an advantageous margin and which is coiled essentially approximately three times about the axis 6 helically. Preferably, the distributor 3 is produced completely from glass, advantageously the channel 5 or flow bed 5, where appropriate including its margins 28, being roughened or blasted.

The pitch of the shallow planar flow bed, (virtually) horizontal in the cross section according to FIG. 8c), along the sorption path is very low, in particular so low that the brine solution only just flows. For example, the pitch or the ratio of the height of the flow bed on a top side 15 of the distributor 3 to the length of the sorption path on the top side 15 of the distributor 3 amounts approximately to between 0.5% and 5%, preferably approximately 7.5/500, that is to say approximately 1.5%. An exceedingly low creeping speed of the sorbent or brine solution along the sorption path or flow bed 5 is thereby implemented, so as to bring about a long dwell time on the distributor 3. This improves sorption, so that pumping round is unnecessary. That is to say, the brine solution does not have to flow twice along the guide element 2 before the water is separated. For example, a guide rod 1 is approximately 2 meters high and, with the aid of the advantageous distributors 3, has a sorption path of approximately 12 meters.

Provided at the center of the distributor 3 is a recess, through which a guide rod 1, for example a few millimeters in diameter, in particular 3 mm, is inserted, so that the distributors 3 are held securely.

The distributor according to FIGS. 8 (8a), 8b) 8c) are not illustrated true to scale) and 9 has, for example, a diameter of approximately 10 to 15 cm, preferably of 12 cm, and is essentially hexagonal in a top view or in horizontal section, so that a virtually closed surface or plane is formed by a plurality of distributors being joined together on one common horizontal plane. This becomes clear inter alia in FIG. 10. Here, for example, a plurality of guide rods 1 with numerous distributors 3 arranged vertically one above the other are used, so that the distributors form a virtually closed plane or layer 17 within the device according to the invention. The wind or air 18 can thereby flow along the layer 17 or the distributors 3 in an aerodynamically beneficial way. This essentially prevents the formation of dead spaces or wind shadows behind the distributors 3, this having a highly advantageous effect on sorption. Also, triangular, square or octagonal cross sections of the distributors 3 are possible, in order to implement a largely closed plane or layer 17.

The "transfer" of the sorbent or brine solution from an upper plane/layer 17 into the next lower layer 17 or plane does not take place, as in the first exemplary embodiment, by a change of the guide elements 1, but instead over an edge 19 from the top side 15 to an underside 16 of the distributor 3. The flow bed 5 or channel 5 on the underside 16 of the distributor 3 is oriented essentially radially and has, rather, the function of a collector of the sorbent, in order to pass this further on to the guide rod 1 or to the distributor element 3 arranged underneath. This channel 5, too, is roughened advantageously. Moreover, the channel 5 has at the outer margin 28 a relatively large diameter in cross section (cf. FIG. 8c)), in order effectively to prevent the sorbent from dropping off or drifting away.

A nose 20 on the underside 16 of the distributor 3 ensures that the sorbent advantageously flows back to the guide rod 1 or along this to the next distributor 3 arranged underneath. The nose 20 corresponds approximately in functional terms to the outflow 10 of the first distributor 3 according to FIGS. 1 to 6, that is to say the transfer of the sorbent from one distributor 3 to the next element, that is to say the guide rod 1 or a distributor 3 arranged underneath, thereby takes place.

In general, it becomes clear that the top side 15 and underside 16 of the (first or second) distributors 3 are designed differently, particularly in terms of function, topography, flow profile or flow bed 5, etc.

Moreover, a guide web 21 is provided, which ensures an advantageous transfer of the sorbent or brine solution from the top side 15 to the underside 16 of the distributor 3.

It basically becomes clear that the distributors 3 according to FIGS. 8 and 9 advantageously have in vertical cross section an aerodynamic shape, for example disk shape, lens shape or the like, the distributor being "thinner" at the marginal region than at the center or in the middle. This, on the one hand, is aerodynamically advantageous and, on the other hand, ensures a pitch of the flow bed both on the top side 15 and on the underside 16 so that gravity "drives" the sorbent or brine solution, that is to say causes it to flow (slowly). The expenditure of artificial energy is consequently unnecessary.

As becomes clear in the figures, a width 27 of the distributor 3 is greater than a height 26 of the distributors 3 (for example, FIG. 8c)). For example, the ratio amounts to between three to ten times the width to the height, in particular approximately 5 to 1 or a height of approximately 2 cm to a width 27 of approximately 11 cm.

The device according to FIGS. 10 and 11 advantageously has an underpressure generation unit, preferably a jacket-type nozzle 22, whereby a certain underpressure can be generated in the region of the distributors 3 or guide rods 1. By two wings 23 advantageously being widened (behind the distributors 3 or guide rods 1 in the direction of flow of the air 18), underpressure is generated inside or in the region of the distributors 3 and advantageously draws the air 18 to the distributors 3 or to the sorbent. This improves sorption according to the invention inter alia in that a dynamic pressure upstream of the distributors 3, such as is caused, for example, in the prior art, is effectively reduced or prevented. Also, dead spaces or wind shadows behind the distributors 3 are thereby reduced or eliminated.

An advantageous wind vane 24 makes it possible, in combination with a rotatability or axis of rotation of the jacket-type nozzle 22 or wings 23, to orient the device according to the invention automatically into the wind 18. Automatic orientation of the plant or of the onflow against the guide elements 1 or distributors 3 or of the sorption path 5 is thereby ensured without the expenditure of artificial energy. The result of this is that the device according to the invention can be operated independently of the wind direction, in particular without the expenditure of external energy for rotating the device or the guide rods 1. Thus, the guide rods 1 with the distributors 3 are also preferably arranged largely symmetrically about the axis of rotation of a wind deflection device or the jacket-type nozzle 22, as becomes clear in the sectional top view in FIG. 11. The hexagonal cross-sectional shape of the individual distributors 3 also results in a hexagonal cross-sectional shape of the respective plane or layer 17, the center or middle of which is advantageously at the same time the axis of rotation.

Furthermore, sunshades 25 or shade-giving means 25 are provided, which keep away incident sunlight or prevent the sorption path or the distributors 3 from being exposed to strong solar radiation. Evaporation of the sorbent or brine solution is thereby advantageously prevented or minimized.

Moreover, the sunshades 25 even advantageously orient inflowing air 18 somewhat onto the planes or layers 17 of distributors 3. This, too, additionally improves sorption. Where appropriate, corresponding sunshades may also be arranged in a way not illustrated in any more detail behind the distributors 3 or guide rods 1 (in relation to the wind direction), in order also from this side to reduce or keep away the solar radiation and/or advantageously to influence or steer the "outflow" of the "drier" air 18.

In general, devices, such as those corresponding essentially to the exemplary embodiment according to FIGS. 10 and 11, can be combined with one another or interconnected in the form of modules both horizontally and/or vertically.

It is basically advantageous to operate a device according to the invention as autonomously as possible, both in terms of the supply of energy and in terms of the production of (drinking) water from atmospheric air. That is to say, the energy should as far as possible come from renewable sources, such as wind, sun, biomass, etc., and the generation of water should be as fault-free or as low-maintenance as possible and be virtually automatic or automated. This can be implemented by means of a device according to the invention in a way which has not been known hitherto. Use inter alia even in remote arid regions of the Earth is therefore feasible, for example in order to satisfy the basic requirements for clean water which are nowadays the subject of rulings by the UN.

What is claimed is:

1. In a device for extracting water from atmospheric air having a flowable sorbent for a sorption of the water, the sorption provided along a sorption path (1, 5), the flowable sorbent disposed along the sorption path (1, 5) on a guide element for guiding the sorbent wherein the improvement comprises, the guide element having at least two distributor elements (3), each having a height lower at a marginal region than in a middle and a top side with a different profile than an underside and a width (27) greater than a height (26) with each of the at least two distributor elements arranged at least partially vertically one above the other, for enlarging a sorption area or sorption path.

2. The device as claimed in claim 1 wherein the width (27) of each of the at least two distributor elements (3) is greater than the height (26) of each of the at least two distributors elements (3) at least by the factor three.

3. The device as claimed in claim 1 wherein the top side (15) of each of the at least two distributor elements (3) has a path-lengthening profile.

4. The device as claimed in claim 1 wherein the sorption path on the underside (16) of each of the at least two distributor elements (3) has a profile oriented in a radial direction.

5. The device as claimed in claim 1 wherein the length of the sorption path (5) on the top side (15) of each of the at least two distributor elements (3) is greater at least by a factor of ten than the vertically oriented sorption height of the sorption path (5) on the top side (15) of each of the at least two distributor elements (3).

6. The device as claimed in claim 5 wherein the length of the sorption path (5) on the top side (15) of each of the at least two distributor elements (3) is greater at least by a factor of fifty than a vertically oriented sorption height of the sorption path (5) on the top side (15) of each of the at least two distributor elements (3).

7. The device as claimed in claim 1 wherein the sorption path (1, 5) extends about an axis (6) of the guide element (1) and/or of the distributor element (3) over at least 180°.

8. The device as claimed in claim 1 wherein each of the at least two distributor elements (3) has a flow bed with an essentially vertically oriented margin (28).

9. The device as claimed in claim 1 wherein the guide element (1) and/or each of the at least two distributor elements (3) have/has at least one contact surface, composed of glass.

10. The device as claimed in claim 1, further comprising at least one capillary unit (11), having at least one capillary (9) to administer the flowable sorbent to the sorption path (1, 5).

11. An apparatus for extracting water from air comprising:
    (a) at least two guide elements;
    (b) at least two substantially flat distributor elements disposed on each of said at least two guide elements, each of said at least two substantially flat distributor elements having a height lower at a marginal region than in a middle region with each of said two substantially flat distributor elements having a top side with a different profile than its underside; and
    (c) a flowable sorbent having a sorption path on the at least two guide elements and the at least two substantially flat distributor elements.

12. The apparatus for extracting water from air of claim 11 wherein the at least two substantially flat distributor elements have a lenticular or wing shaped cross section.

13. The apparatus for extracting water from air of claim 11 wherein the at least two substantially flat distributor elements are arranged in tiers.

14. The apparatus for extracting water from air of claim 11 wherein the top side of the at least two substantially flat distributor elements has a path lengthening profile.

15. The apparatus for extracting water from air of claim 11 further comprising a capillary unit disposed between the at least two guide elements and the at least two substantially flat distributor elements.

16. The apparatus for extracting water from air of claim 11 further comprising a metering unit to meter the flowable sorbent.

17. A device for extracting water from atmospheric air comprising:
    (a) a plurality of guide elements;

(b) a plurality of distributor elements, each of said plurality of distributor elements having a height lower at a marginal region than in a middle region and a top side path lengthening profile greater than an underside profile;
(c) a capillary unit disposed between the plurality of guide elements and the plurality of distributor elements; and
(d) a metering unit to meter a flowable sorbent.

18. The device for extracting water from atmospheric air of claim 17 wherein the plurality of distributor elements are arranged substantially horizontally in tiers.

* * * * *